(12) United States Patent
Chen

(10) Patent No.: US 8,863,778 B2
(45) Date of Patent: Oct. 21, 2014

(54) CERAMIC WATER CONTROL VALVE

(71) Applicant: Mei-Li Chen, Taichung (TW)

(72) Inventor: Mei-Li Chen, Taichung (TW)

(73) Assignee: Kuching International Ltd., Taichung (TW)

( * ) Notice: Subject to any disclaimer, the term of this patent is extended or adjusted under 35 U.S.C. 154(b) by 104 days.

(21) Appl. No.: 13/773,891

(22) Filed: Feb. 22, 2013

(65) Prior Publication Data

US 2014/0238517 A1  Aug. 28, 2014

(51) Int. Cl.
*F16K 11/06*  (2006.01)
*F16K 11/02*  (2006.01)

(52) U.S. Cl.
CPC ...................... *F16K 11/02* (2013.01)
USPC ...................... 137/625.41; 251/297

(58) Field of Classification Search
USPC ............... 137/625.4, 625.41; 251/297
See application file for complete search history.

(56) References Cited

U.S. PATENT DOCUMENTS

| | | | | |
|---|---|---|---|---|
| 2,377,473 A | * | 6/1945 | Wolcott ................. | 137/625.11 |
| 3,115,896 A | * | 12/1963 | Roberts et al. ........... | 137/625.41 |
| 3,823,742 A | * | 7/1974 | Von Corpon ............. | 137/636.3 |
| 5,522,429 A | * | 6/1996 | Bechte et al. ............ | 137/625.17 |
| 5,592,971 A | * | 1/1997 | Knapp ..................... | 137/625.41 |
| 6,170,523 B1 | * | 1/2001 | Chang ..................... | 137/625.17 |
| 6,321,789 B1 | * | 11/2001 | Chen ....................... | 137/625.17 |
| 6,966,335 B2 | * | 11/2005 | Chen ....................... | 137/625.17 |
| 7,219,696 B2 | * | 5/2007 | Cattaneo .................. | 137/625.4 |
| 8,490,653 B2 | * | 7/2013 | Chen ....................... | 137/625.4 |

* cited by examiner

*Primary Examiner* — John Fox
(74) *Attorney, Agent, or Firm* — Egbert Law Offices, PLLC

(57) ABSTRACT

A ceramic water control valve with cold, hot and warm water positioning function includes a valve casing with an annular frame of reduced diameter, a rotary driving seat with a projecting tube part, a valve stem, a ceramic valve plate set, and a base. A rotatable ring is installed outside the annular frame of reduced diameter. At the top edge of the rotatable ring, a trepan boring is installed to allow the projecting tube part to protrude upward. A simultaneous movement cooperating unit includes the driving part installed inside projecting tube part and the driven part installed in the rotatable ring top edge. The driving part and driven part can cooperate the drive the rotatable ring simultaneously in the rotation of the rotary driving seat. A scale division positioning unit is installed at the position corresponding to the rotatable ring and the annular frame of reduced diameter.

4 Claims, 8 Drawing Sheets

CERAMIC WATER CONTROL VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic water control valve, and more particularly to an innovative design of the structure of ceramic water control valve which has a cold, hot and warm water positioning function.

2. Description of Related Art including Information Disclosed under 37 CFR 1.97 and 37 CFR 1.98

In the use of a water faucet with dual functions of hot and cold water supply, as the faucet control sailor can realize changes of cold, hot and warm water in a short trip of about 90 degrees of rotation, it is often difficult for the user to precisely control water temperature, and the water temperature may easily be changed by displacement of the water faucet sailor caused by the user, causing distress and inconvenience in the use of the faucet with dual functions of hot and cold water supply.

To address the aforementioned problems, a structural mechanism that can allow the water control sailor to be embedded in given water temperature positions has been developed by the industry. In general, it is set in the ceramic water control valve structure inside the water faucet. The one under discussion in the present invention is specifically modified based on such a ceramic water control valve structure with the cold, hot and warm water positioning function.

Thus, to overcome the aforementioned problems of the prior art, it would be an advancement if the art is to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The enhancements of the present invention are as follows: the present invention of "a ceramic water control valve with the cold, hot and warm water positioning function" is mainly an innovative structural design comprising a valve casing of annular frame of reduced diameter, a rotary driving sea t with a projecting tube part, a valve stem, a ceramic valve plate set, a base and a rotatable ring, a simultaneous movement cooperating unit, a scale division positioning unit, and a position limiting mechanism. Compared with previous technology, in the present invention, a rotatable ring is installed outside the annular frame of reduced diameter of the valve casing, and it is easier to match and more clearly identify the relative positions of parts. In addition, in the present invention, a scale division positioning unit is installed in the position corresponding to the annular frame of reduced diameter of valve casing and rotatable ring. By the cooperation of a concave flange part and a convex flange part of the scale division positioning unit, the positioning function of the valve stem at the cold water mode and hot water mode is realized. Hence, the present invention can realize the assembly of the cold, hot and warm water positioning structure of the ceramic water control valve more convenient, efficient with better scale division positioning, effect and enhance product practicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
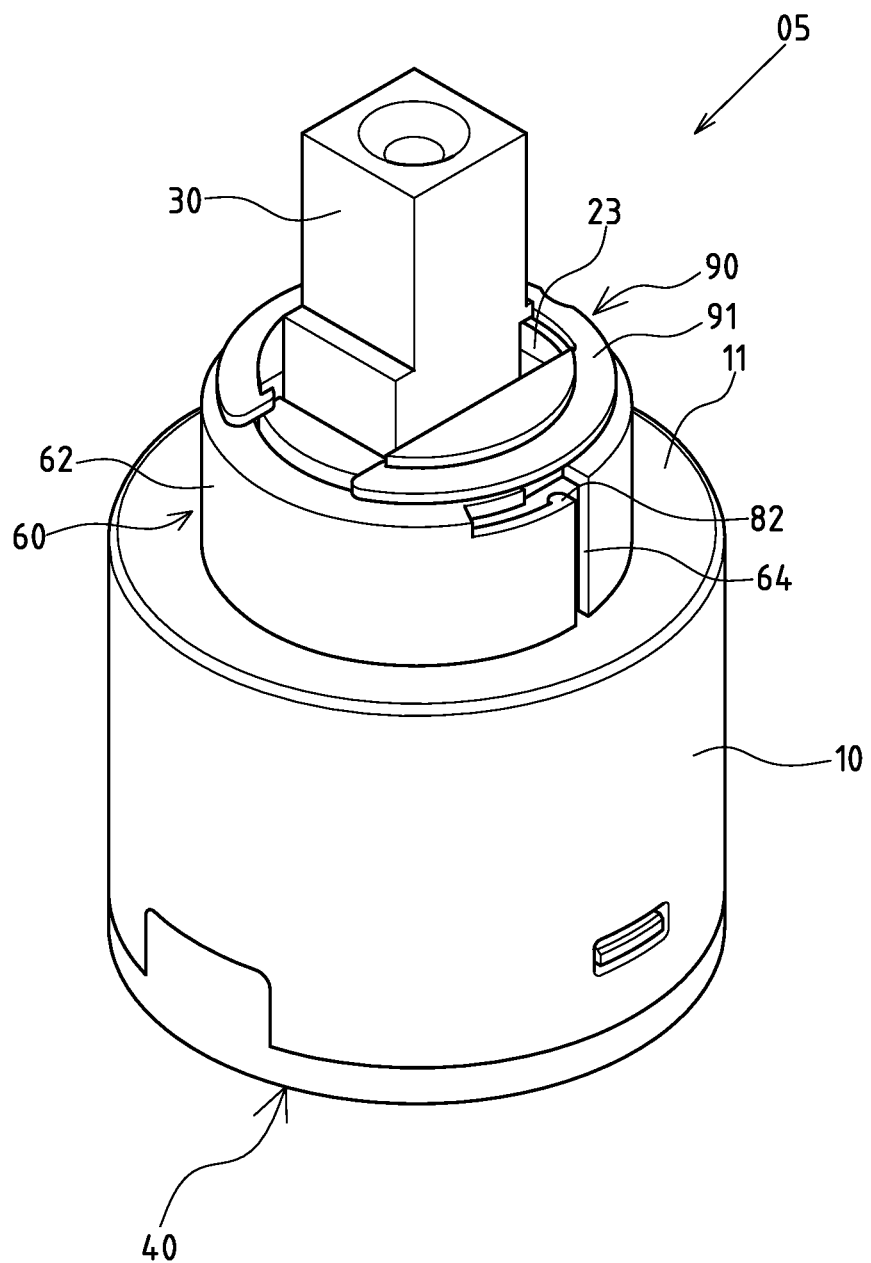
FIG. 1 is a perspective view of the present invention.

FIGS. 1 to 7 illustrate the implementations of the ceramic water control valve with the cold, hot and warm water positioning function of the present invention. However, the implementations are for illustration use only and patent application is not limited by such structures. Said ceramic water control valve 05 comprises the following parts.

A valve casing 10 of a hollow cylindrical type is provided and comprises a top surface 11 and a bottom port 12. The top surface 11 has an annular frame of reduced diameter 13 in convex set. A rotary driving seat 20 comprises an inner seat part 21 and projecting tube part of reduced diameter 22, and the inner seat part 21 is installed inside valve casing 10 at the end near top surface 11. The projecting tube part 22 goes through the annular frame of reduced diameter 13 of valve casing 10. A go-through valve stem hole 23 is installed at the center of the rotary driving seat 20 (please refer to FIGS. 1 and 2).

A valve stem 30 that can swing is located in the valve stem hole 23 of the rotary driving seat 20 by a horizontal pivot 31

(only marked in FIG. 2) set. The inner set of valve stem 30 is installed with a rotary seat 32, the projecting tube part 22 of rotary driving seat 20 protrudes outside of the valve stem 30, and the rotary driving seat 20 will be driven by the rotation of valve stem 30.

A base 40 located at the bottom port 12 of valve casing 10 comprises a cold water inlet hole 41, a hot water inlet hole 42 and a water guide hole 43.

A ceramic valve plate set 50 is installed inside valve casing 10 and comprises a stationary valve plate 51 and a rotary valve plate 52. The stationary valve plate 51 is located in combination on the inner surface of base 40, comprising a cold water perforation hole 53, a hot water perforation hole 54 and a water perforation hole 55. Rotary valve plate 52 is installed in stack on the inner surface of stationary valve plate 51 and is driven by the rotary seat 32 installed inside valve stem 30. Said rotary valve plate 52 comprises a water flow control groove 56, the cold water perforation hole 53 of the stationary valve plate 51, hot water perforation hole 54 and water perforation hole 55.

A rotatable ring 60 is installed in group outside the annular frame of reduced diameter 13 on top surface 11 of valve casing 10 at the state of external installation type. The rotatable ring 60 has a top edge 61 and a periphery side 62. The to edge 61 has a trepan boring 63 for the upward protruding of projecting tube part 22 of rotary driving seat 20.

A simultaneous movement cooperating writ 70 comprises a driving part 71 installed at the projecting tube part 22 of rotary driving seat 20 and the driven part 72 installed at the top edge of the rotatable ring 60. Said driving part 71 and driven part 72 can be relatively embedded with each other to allow rotary driving seat 20 to drive the rotatable ring 60 in rotation simultaneously.

A scale division positioning unit 80 is installed at the position corresponding to the annular frame of reduced diameter 13 on top surface 11 of valve casing 10 and rotatable ring 60 comprising a concave flange part 81 and a convex flange part 82 (please refer to FIGS. 3, 4, 5), both concave flange part 81 and convex flange part 82 are of bounce-inability. The number and location of convex flange part 81 and concave flange part 82 should he set to allow the relative embedding of rotatable ring 60 rotating with valve stem 30 at the cold water and the hot water mode. In this way, the actuations of valve stem 30 at the cold water mode and hot water mode can realize positioning.

Figure 9:
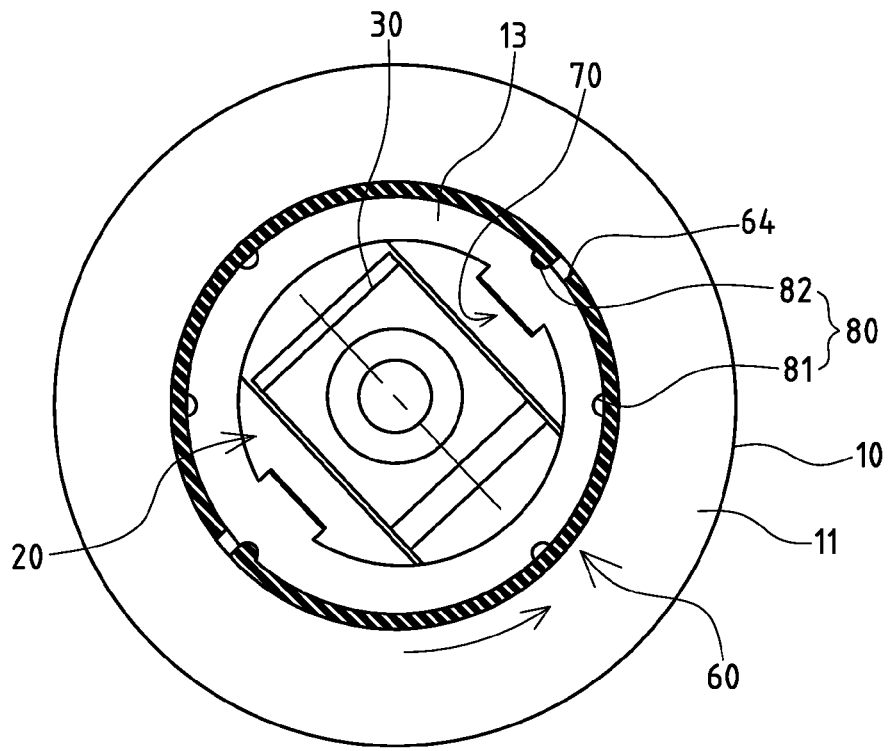
FIG. 9 is a diagram of the invention in operation.
Figure 10:
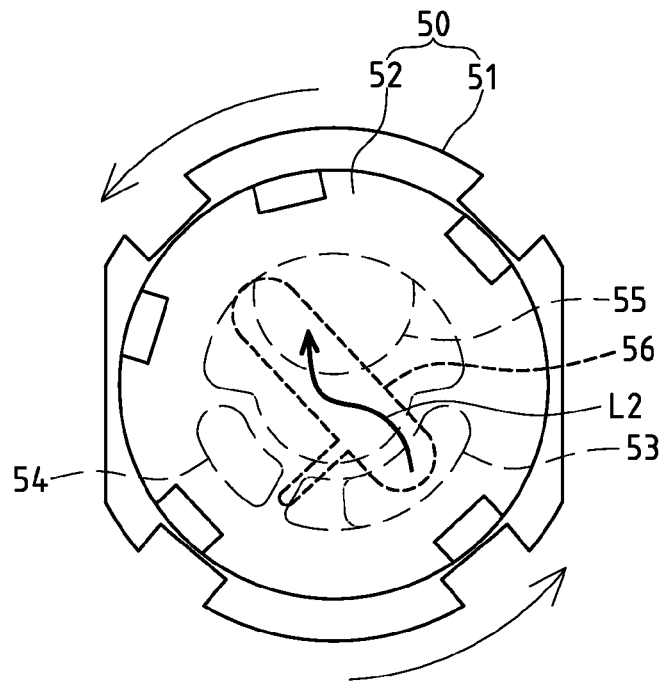
FIG. 10 is schematic diagram of the present invention switched to cold water mode.
Figure 11:
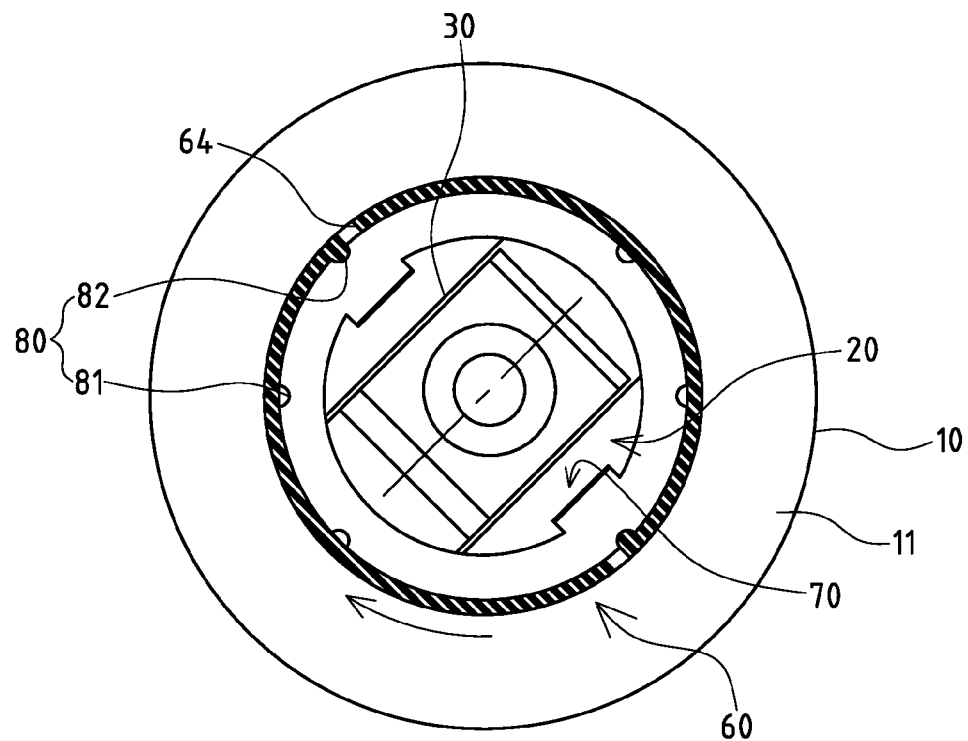
FIG. 11 is a schematic diagram of the present invention switched in operation mode.
Figure 12:
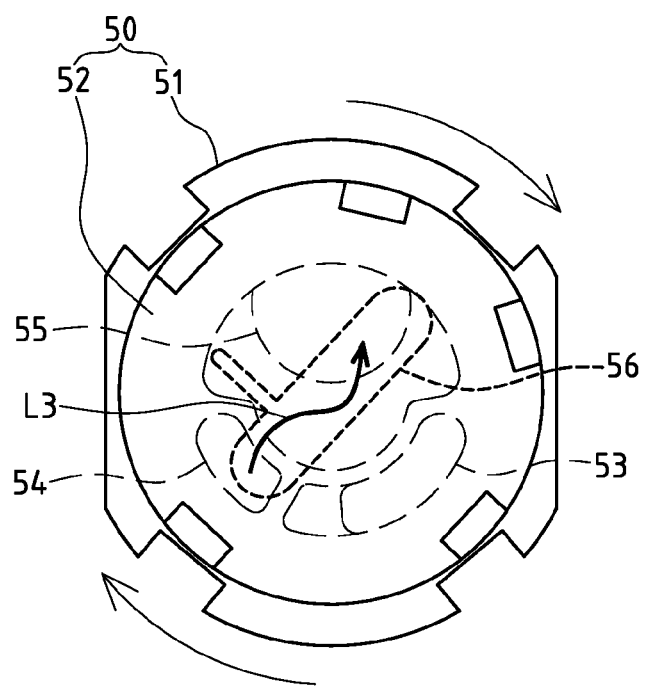
FIG. 12 is a schematic diagram of the present invention switched to hot water mode.

Said cold water mode is as illustrated in FIGS. 9 and 10. When valve stem 30 rotates (for example, in reverse rotation, the part is not limited), rotary driving seat 20 will be driven at the same time to link water flow control groove 56 of rotary valve plate 52, cold water perforation hole 53 of stationary valve plate 51, and water perforation bole 55 to allow the cold water to (such as shown by arrow mark L2) pass. Said hot water mode is shown referring to FIGS. 11 and 12. When valve stem 30 rotates (for example, in forward rotation), the water flow control groove 56 of rotary valve plate 52, hot water perforation hole 54 of stationary valve plate 51, and water perforation hole 55 will be connected to allow the hot water (such as shown by arrow mark L3) to pass. In addition, when valve stem 30 is at the non-rotary state, it is at the warm water mode, and the water flow control groove 56 of rotary valve plate 52 is connected with cold water, hot water perforation holes 53, 54 of stationary valve plate 51 and water perforation hole 55 to mix the cold and hot water to flow out of the water perforation hole 55 (such as shown by arrow mark L1). A position limiting mechanism 90 is used to limit the state of the rotatable ring 60 to prevent any random disengagement.

According to the above structural design, in the present invention, the rotatable ring 60 is set outside of the annular frame of reduced diameter 13 of the valve casing 10, it easier to match and more clean identify the positioning of relevant parts in assembly. In addition, in the present invention, a scale division positioning unit 80 is installed at the position corresponding to annular frame of reduced diameter 13 of valve casing 10 and rotatable ring 60 to realize the positioning of valve stem 30 in actuation at the cold water mode and hot water mode by the cooperation of concave flange part 81 and convex flange part 82 of the scale division positioning unit 80. In this way, by comparison, the generally known positioning mechanisms that have the scale division blocking function have disadvantages such as difficulty in assembly, inefficiency and difficulty to achieve better positioning strength when installed inside the valve casing of the ceramic water control valve, the present invention can realize more convenient and efficient assembly of the cold, hot and warm temperature positioning structure of the ceramic water control valve 05 and better realize scaled positioning strength and effect as well as improving product practicability.

Figure 2:
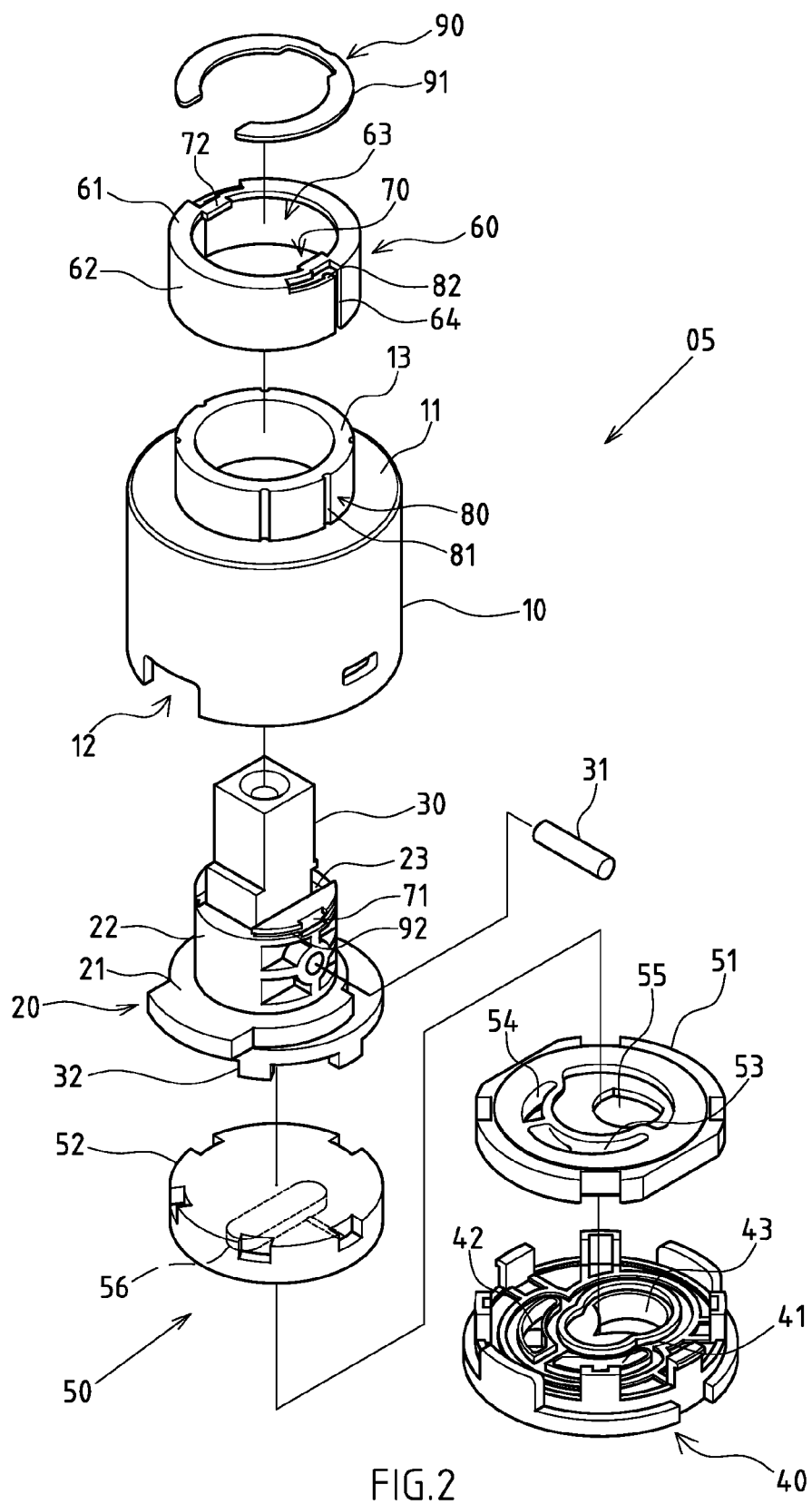
FIG. 2 is an exploded perspective view of the present invention.

Referring to FIG. 2, the implementation of driving part 71 of the simultaneous movement cooperating unit 70 is realized by the concave grooves at both sides of projecting tube part 22 of rotary driving seat 20. The driven part 72 is realized by the convex grooves at both sides of trepan boring 63 of top edge 61 of rotatable ring 60. The setting types of both can be contrary and this pan is not limited.

Figure 3:
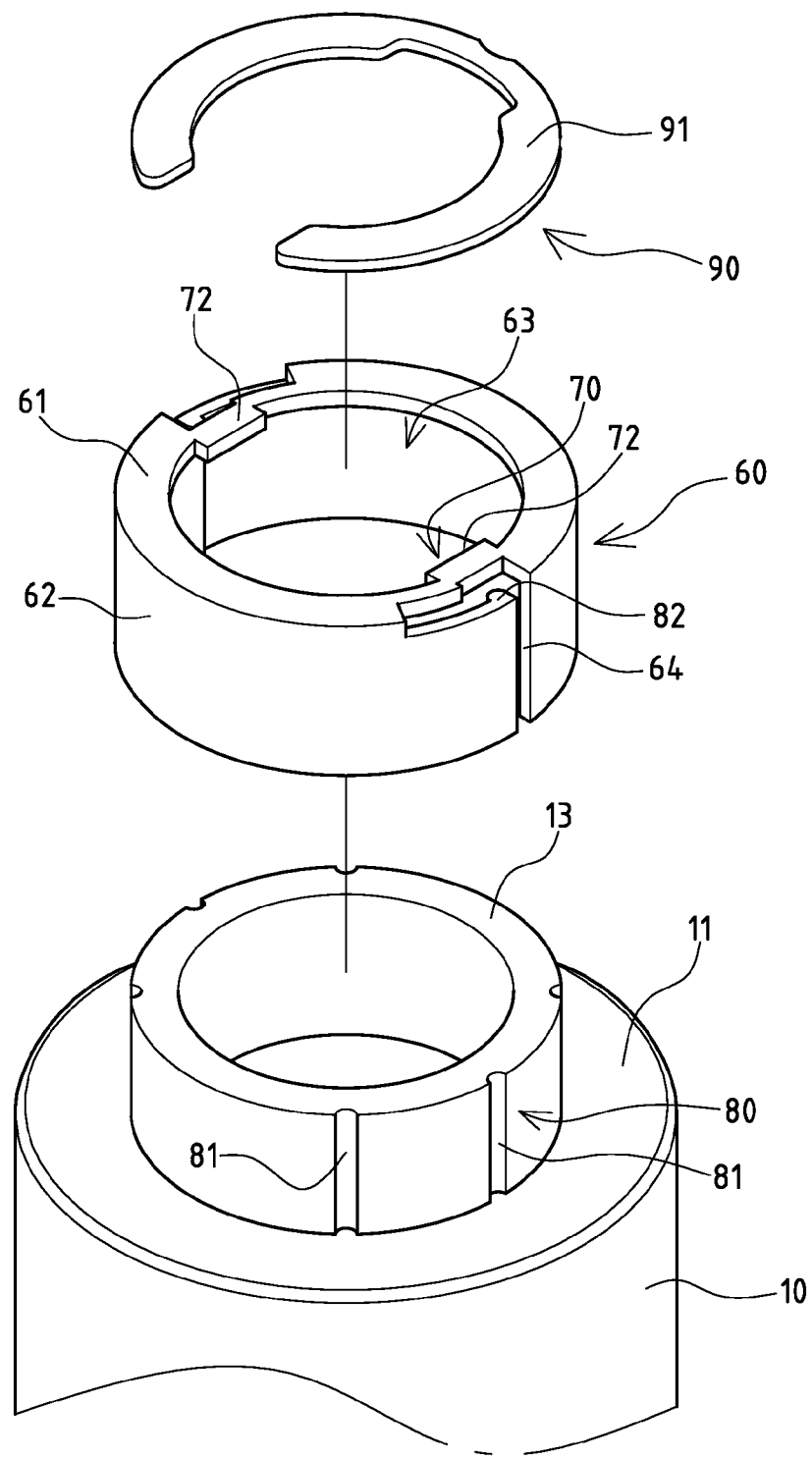
FIG. 3 is an exploded perspective view of the parts of the present invention.
Figure 4:
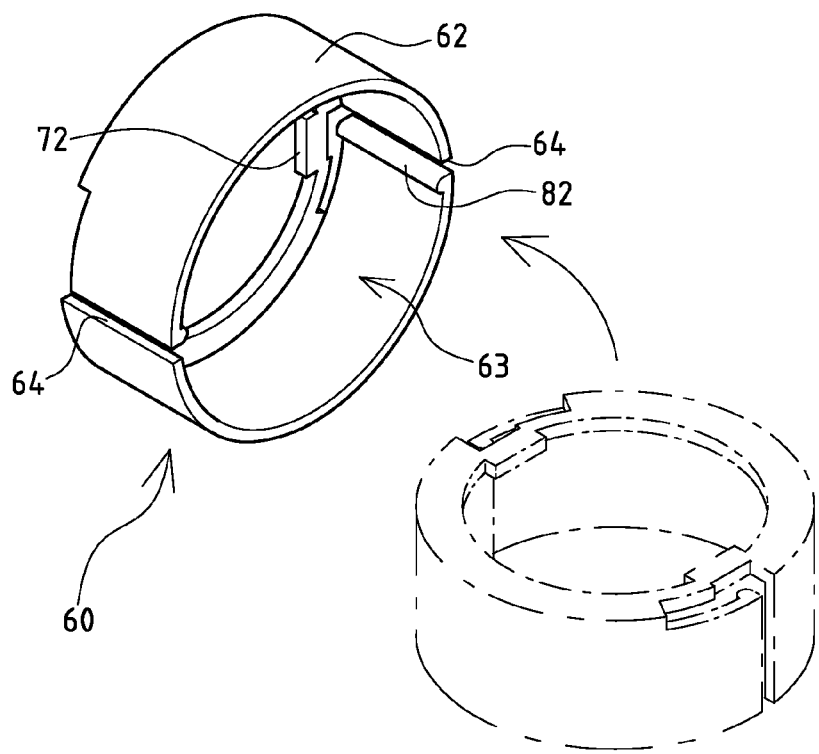
FIG. 4 is a 3D diagram of the rotatable ring of the present invention.
Figure 5:
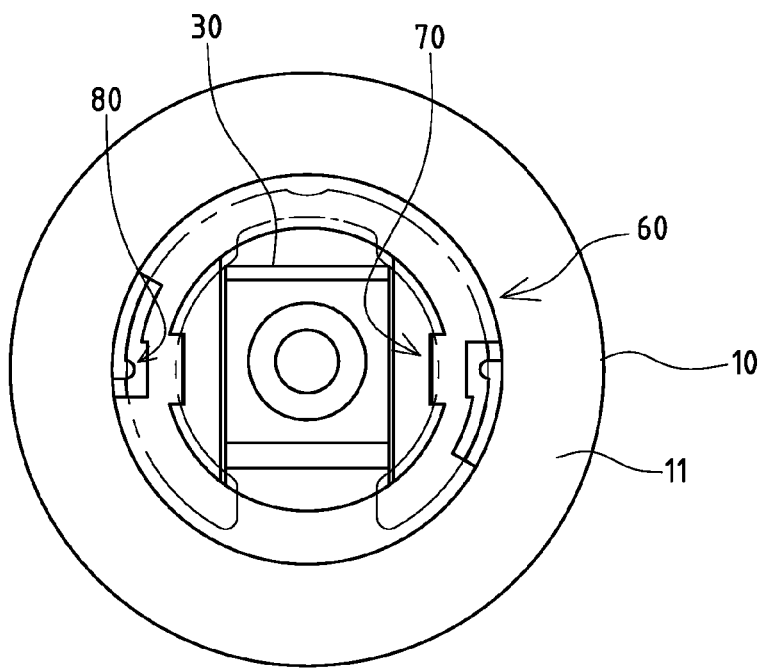
FIG. 5 is a plan view of the present invention.
Figure 6:
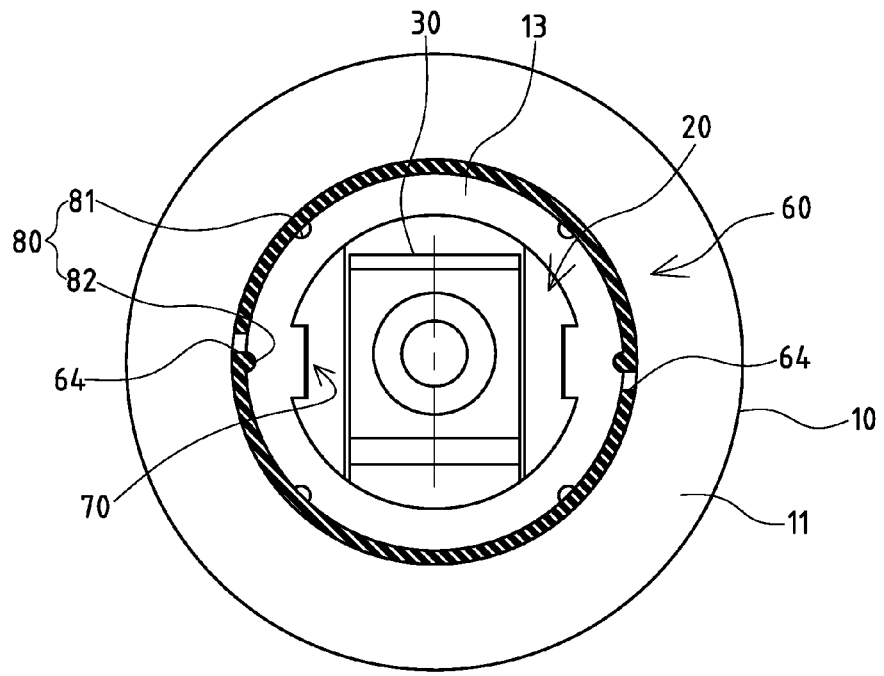
FIG. 6 is a plan sectional view of the present invention.
Figure 7:
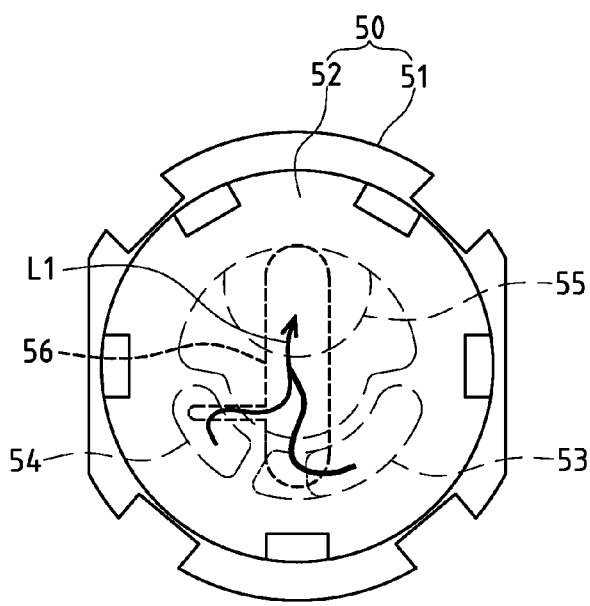
FIG. 7 is a schematic diagram of the present invention at the warm temperature mode.
Figure 8:
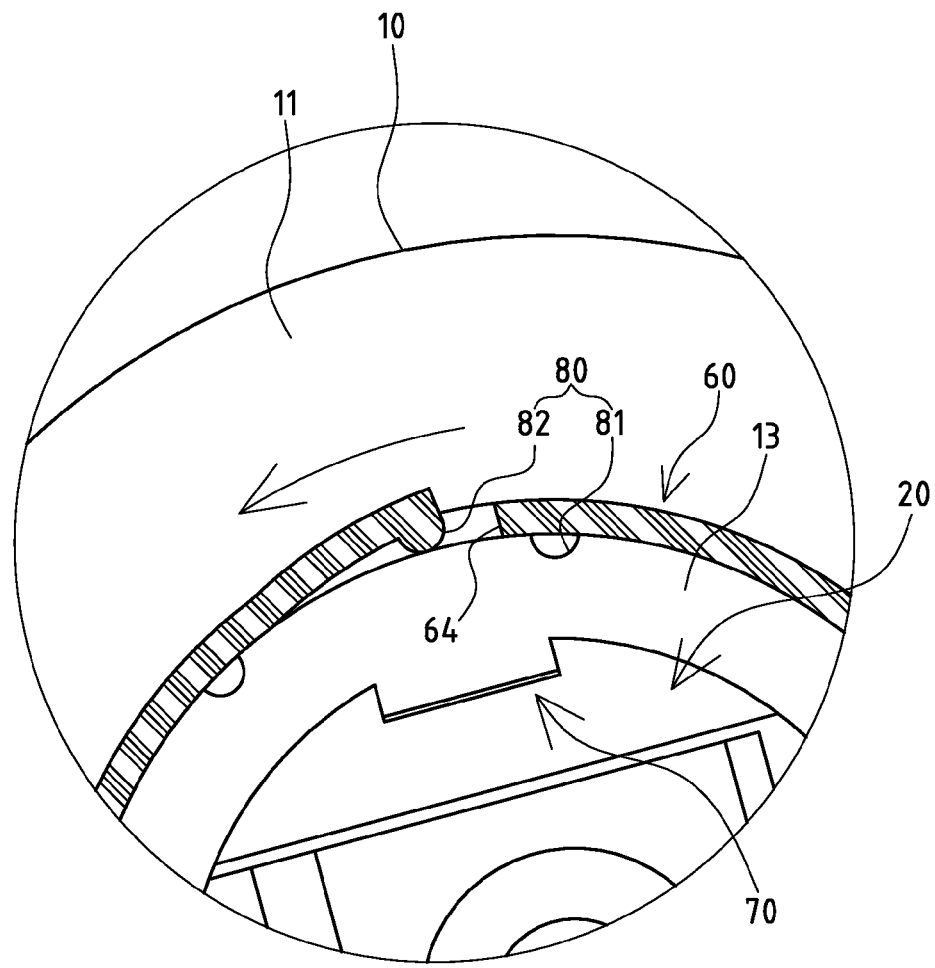
FIG. 8 is an enlarged view of the partial operation of the present invention.

Referring to FIGS. 2, 3 and 8, the implementation of concave flange part 81 of scale division positioning unit 80 is realized by three separate concave grooves on both sides of the annular frame of reduced diameter 13 of top surface 11 of valve casing 10. The implementation of convex flange part 82 is realized by a vertical convex groove on the inner surface on both sides of periphery side 62 of rotatable ring. Moreover, on periphery side 62 of rotatable ring 60, convex flange part 82 and the disengagement part 64 are installed to realize the bounce-flexibility of convex flange part 82. Convex flange part 82 and three groups of concave flange part 81 can realize mutual embedding for positioning at the given warm water mode, cold water mode, and hot water mode.

Referring to FIGS. 2 and 3, said position limiting mechanism 90 is realized by projecting tube part 22 of rotary driving seat 20 assembled by a C-shaped buckle 91. A buckle groove 92 is formed at the height higher than rotatable ring 60 top edge 61 of projecting tube part 22. By assembling C-shaped buckle 91 with the buckle groove 92, rotatable ring 60 can thus be controlled to limit its status.

I claim:

1. A ceramic water control valve with the cold, hot and warm water positioning function, comprising:
   a valve casing, of hollow cylindrical type, comprises a top surface and a bottom port, wherein, the top surface with an annular frame of reduced diameter in convex set;
   a rotary driving seat comprises an inner seat part and a projecting tube part in reduced diameter, said inner seat part is installed inside valve casing near to surface, the projecting tube part goes through the annular frame of reduced diameter of valve casing, a go-through valve stem hole is set at the center of the rotary driving seat;
   a valve stem that can swing is located in the valve stem hole by a rotary driving seat by a horizontal pivot set; the inner set of valve stem is installed with a rotary seat, projecting, tube part of rotary driving seat protrudes outside of the valve stem, and the rotary driving seat will be driven by the rotation of valve stem;

a base located at the bottom port of the valve casing, comprises a cold water inlet hole, a hot water inlet hole and a water guide hole;

a ceramic valve plate set. installed inside the valve casing comprises a stationary valve plate and a rotary valve plate; the stationary valve plate is located in combination on the inner surface of base, comprising a cold water perforation hole, a hot water perforation hole and a water perforation hole; the rotary valve plate is installed in stack on the inner surface of stationary valve plate and is driven by the rotary seat installed inside valve stein; said rotary valve plate comprises a water flow control groove, the cold water perforation hole of the stationary valve plate, hot water perforation hole and water perforation hole;

a rotatable ring is installed, in group outside the annular frame of reduced diameter on the top surface of the valve casing at the state of external installation type; said rotatable ring has a top edge and a periphery side, the to edge has a trepan boring for the upward protruding of projecting tube part of rotary driving seat;

a simultaneous movement cooperating unit comprises the driving part installed at the projecting tube part of the rotary driving seat and the driven pan installed at the top edge of the rotatable ring; said driving part and driven part can be relatively embedded with each other to allow rotary driving seat to drive the rotatable ring in rotation simultaneously;

a scale division positioning, unit installed at the position corresponding to the annular frame of reduced diameter on top surface of valve casing and rotatable ring comprising a concave flange part and a convex flange part, both concave flange part and convex flange pan are of bounce-mobility; the number and location of convex flange pan and concave flange part should be set to allow the relative embedding of rotatable ring rotating with valve stem at the cold water and the hot water mode; in this way, the actuations of valve stem at the cold water mode and hot water mode can realize positioning;

a position limiting mechanism is used to limit the state of the rotatable ring to prevent its random disengagement.

2. The structure defined in claim 1, wherein, the driving part of the simultaneous movement cooperating unit is installed in the concave groove of the projecting tube part of the rotary driving seat; the driven part is installed in the concave groove on both sides of the trepan boring of the rotatable ring top edge.

3. The structure defined in claim 2, wherein, the concave flange part of the scale division positioning unit is installed at the three groups of separate concave grooves on both sides of the annular frame of reduced diameter on the top surface of the valve casing; the convex flange part is installed in a group of the concave groove on both sides of the periphery side of the rotatable ring, and a disengagement part is installed at the convex flange part on the periphery side of rotatable ring to realize the bounce-flexibility of the convex flange part; the convex flange part and three groups of concave flange part can realize the mutual embedded positioning state at the warm water mode, cold water mode, and hot water mode.

4. The structure defined in claim 3, wherein, said position limiting mechanism is realized by the assembly of the projecting tube part of the rotary driving seat with as C-shaped buckle; it forms a buckle groove at the height higher than the rotatable ring top edge of projecting tube part and assembles the C-shaped buckle with the groove to press the rotatable ring to limit its state.

* * * * *